THERMOELECTRIC COOLING UNITS

Filed Aug. 10, 1956

INVENTORS
FREDERICK JOHN BECKET
HARRY BURY
REGGIE SMITH
BY Kirschstein, Kirschstein & Ottinger
ATTORNEYS INVENTORS
FREDERICK JOHN BECKET
HARRY BURY
REGGIE SMITH
BY Kurschstein, Kurschstein & Ottinger
ATTORNEYS April 19, 1960 F. J. BECKET ET AL 2,932,953

THERMOELECTRIC COOLING UNITS

Filed Aug. 10, 1956 6 Sheets-Sheet 3

INVENTORS
FREDERICK JOHN BECKET
HARRY BURY
REGGIE SMITH
BY Fuschstein, Fuschstein & Ottinger
ATTORNEYS INVENTORS
FREDERICK JOHN BECKET
HARRY BURY
REGGIE SMITH
BY Kirschstein, Kirschstein, & Ottinger
ATTORNEYS

THERMOELECTRIC COOLING UNITS

Filed Aug. 10, 1956 6 Sheets-Sheet 5

INVENTORS
FREDERICK JOHN BECKET
HARRY BURY
REGGIE SMITH
BY Kirschstein, Kirschstein & Ottinger
ATTORNEYS INVENTORS
FREDERICK JOHN BECKET
HARRY BURY
REGGIE SMITH
BY Fischer, Fischer & Ottinger
ATTORNEYS 2,932,953

THERMOELECTRIC COOLING UNITS

Frederick John Becket, Kenton, Harry Bury, Ickenham, and Reggie Smith, Kenton, England, assignors to The General Electric Company Limited, London, England, a British company Application August 10, 1956, Serial No. 603,328

Claims priority, application Great Britain August 12, 1955

13 Claims. (Cl. 62—3)

This invention relates to thermoelectric cooling units for refrigerators or other refrigerating spaces, and particularly to thermoelectric cooling units of the kind comprising an assembly of thermo-junctions electrically connected to provide one or more series circuits. One of the objects of the present invention is the provision of a compact cooling unit of this kind which can, for example be removably built into the wall of a refrigerating chamber.

According to the present invention, a thermoelectric cooling unit comprises an assembly of thermojunctions electrically connected to provide one or more series circuits, each thermojunction having a p-type semiconductor element in association with an n-type semiconductor element, one or more heat-conducting surfaces each in thermal contact with one or more hot junctions of the said assembly adapted to be cooled by a cooling medium, and one or more heat conducting surfaces each in thermal contact with one or more cold junctions of the said assembly, adapted to cool a space, surface or the like.

The first mentioned heat-conducting surface (or surfaces) may comprise an assembly of metallic fins arranged to be cooled by a cooling fluid, and the second mentioned heat-conducting surface (or surfaces) may comprise an assembly of metallic fins adapted to fit inside the refrigerating chamber of a refrigerator or the like.

In one construction of cooling unit according to the present invention, metallic fins are connected directly to the hot and cold junctions, these fins being cooled, or heated, as the case may be, either by natural or forced air circulation. In order to minimise the temperature gradient between a junction and a fin, a heavy sectioned fin-root may be soldered to the junction, and the fin soldered or brazed to this fin-root. Alternatively the complete fin and root may be cast or forged in one piece.

In an alternative construction of cooling unit according to the present invention, a liquid-vapour/phase cooling system, situated inside the refrigerating chamber, is adapted to effect transfer of heat from the chamber to the cold junctions, and a liquid-vapour/phase cooling system situated outside the chamber is adapted to effect transfer of heat from the hot junctions to the atmosphere. A variation of this method would be to mount the evaporator coil of the first mentioned cooling system inside the refrigerating chamber, and the condenser outside; thus the refrigerator chamber could be fully insulated thermally, with only the pipe connections passing through the chamber wall. Alternatively a combination of the fin cooling and the liquid-vapour/phase cooling systems may be used, in which cooling fins are situated on one side of the thermojunction assembly, and a liquid-vapour/phase cooling system is situated on the other side.

In a preferred embodiment of the invention, a refrigerator or the like, having a cooling unit of the kind specified, is provided with a heat sensitive device arranged to control a two stage energisation of the refrigerating system, firstly to effect rapid reduction of the chamber temperature to a predetermined value, and secondly to maintain the temperature at that value. The said heat-sensitive device may comprise a thermal switch associated with a transformer which is arranged to supply current to the semiconductors through a rectifier, the primary of the transformer having two line tappings of different turns ratios with respect to the secondary winding. Alternatively the heat-sensitive device may comprise a switch which is arranged to short circuit a choke, or dropping resistor, connected in series with the semiconductors.

The invention will now be described by way of example with reference to the accompanying diagrammatic drawings, in which.

For simplicity, the same reference numerals have been used throughout the figures for similar parts.

Figures 1, 2:
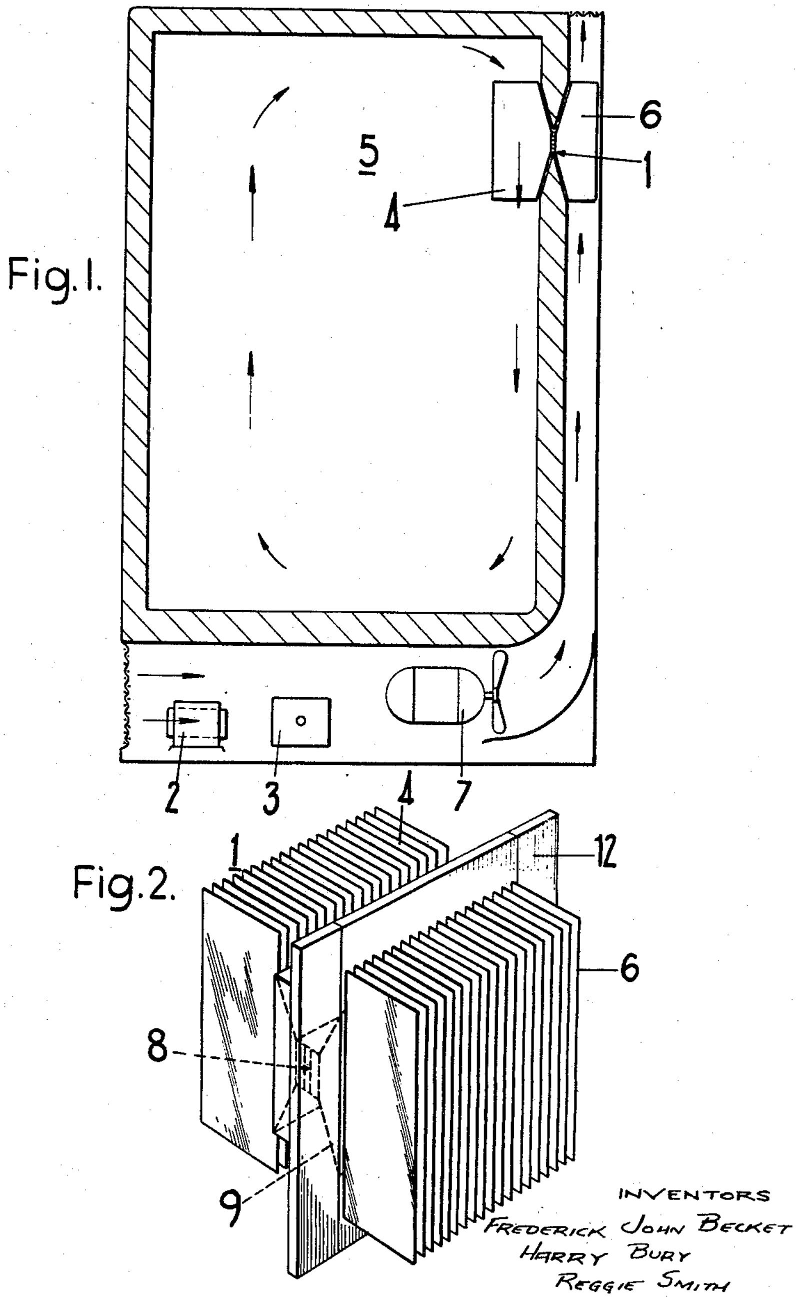
Figure 1 shows, in section, a side elevation of a refrigerator incorporating a cooling unit according to one embodiment of this invention.
Figure 2 is a perspective view of the cooling unit shown in Figure 1.
Figures 3, 5:
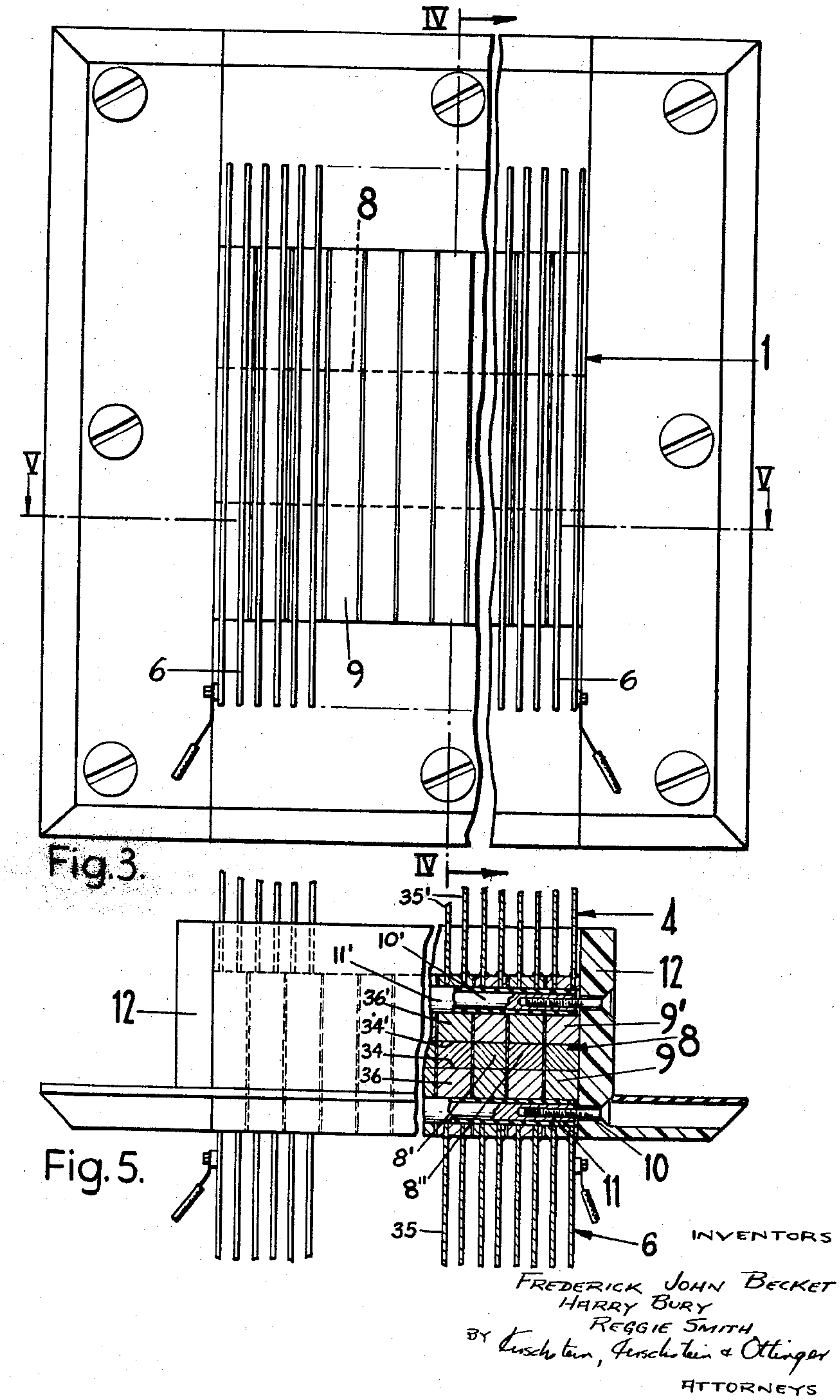
Figure 3 is a front elevation partly broken of the cooling unit shown in Figure 1.
Figure 5 is a part section on line V—V in Figure 3.
Figure 4:
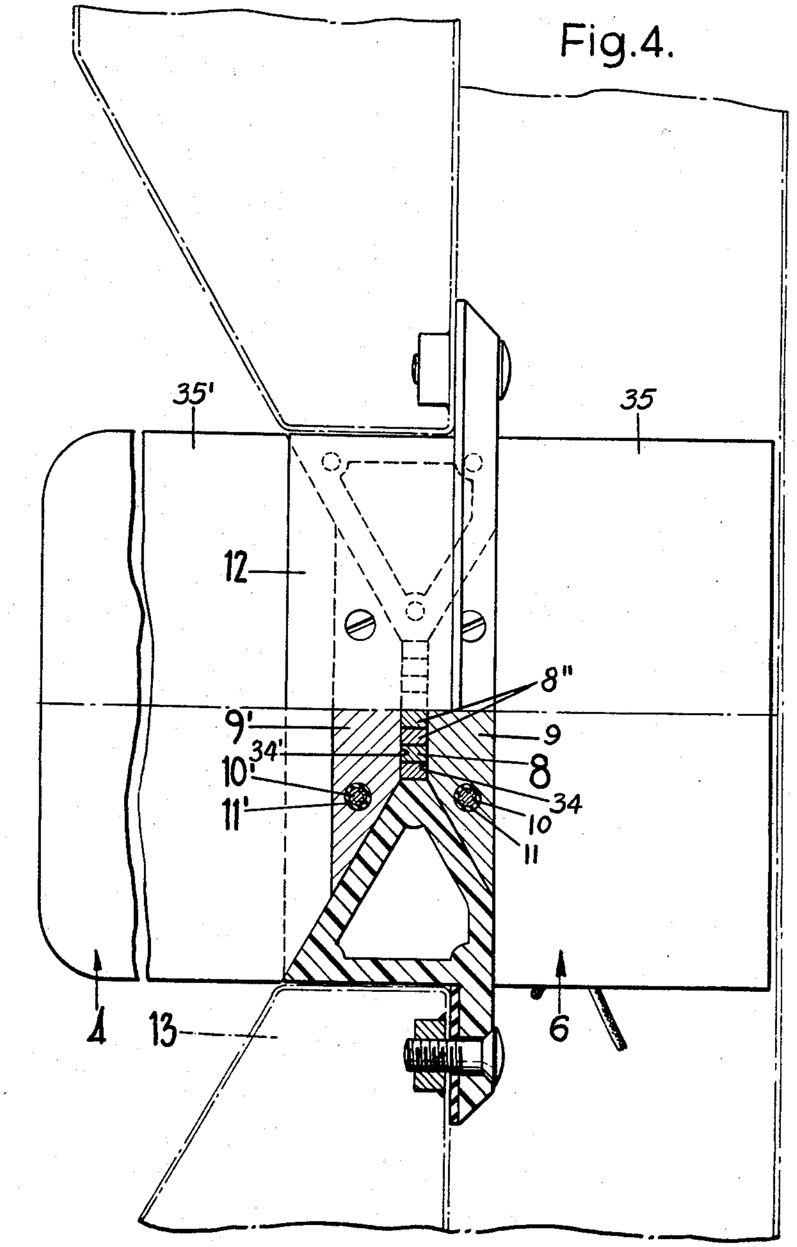
Figure 4 is a half section on line IV—IV in Figure 3.

Referring to Figure 1, the figure shows a refrigerator, incorporating an air-cooled thermoelectric cooling unit 1 in accordance with the present invention, electric current being supplied to the cooling unit from a transformer 2 and rectifier 3. Copper fins 4, situated in the refrigerating chamber 5 of the refrigerator, are connected to the cold junctions of a thermo-junction assembly incorporated in the cooling unit 1, and copper fins 6, situated outside the chamber are connected to the hot junctions. A fan 7 maintains a circulation of cooling air through the external fins 6, while natural convection within the chamber 5, maintains a constant flow of air through the internal fins 4.

Figures 2, 3, 4 and 5 illustrate in greater detail the cooling unit shown in Figure 1 and referring also to these figures, the semi-conductor assembly 8 is composed of a number of alternate p-type and n-type semiconductor elements 8′ and 8″ connected in series, and copper cooling fin assemblies 4 and 6 are connected directly to the cold and hot junctions respectively, each cooling fin assembly 4 (or 6) providing a first heat transfer surface 34 (or 34′) disposed in thermal contact with its associated junctions, a second heat transfer surface 35 (or 35′) of larger area than the first heat transfer surface, and a conducting mass 36 (or 36′) for conducting heat between the said surfaces. In order to minimise the temperature gradient between the junctions and the fin assemblies, heavy sectioned fin-roots 9 and 9′ are soldered to the junctions and lighter sectioned fins are soldered or brazed to the fin-roots 9 and 9'. Alternatively a complete fin and root may be cast or forged in one piece.

The method of assembly of the semi-conductor elements will now be described. A number of semiconductor elements 8 of similar type are joined directly to fin roots 9, by soldering, each element being sandwiched between two fin roots. Cooling fins 4 and 6 are brazed to each pair of fin roots and the finned semiconductors are then grouped into alternate p and n types and clamped together, and a layer of insulating material such as a varnish coating is sandwiched between each semiconductor row. Clamping of the semiconductor elements may conveniently be carried out by means of a long bolt assembly 10, insulated by a paxolin tube 11, and clamping the elements between a pair of plastic end flanges 12. The fins and fin roots may be of aluminum instead of copper, thereby reducing the weight of the unit; in this case the semiconductor elements and the surfaces of the fin roots to be soldered thereto should be nickel-plated to facilitate soldering. Electrical connections are now made as required via the cooling fins 4 which now form part of the circuits; the rows of thermojunctions are connected electrically in series by soldering together appropriate pairs of fin roots, or alternatively by coating the fin roots with indium and joining appropriate pairs by pressure. It will be seen that an assembly of this type readily lends itself to the forming of a panel which can be built into the wall 13 of a refrigerating chamber.

Figure 6:
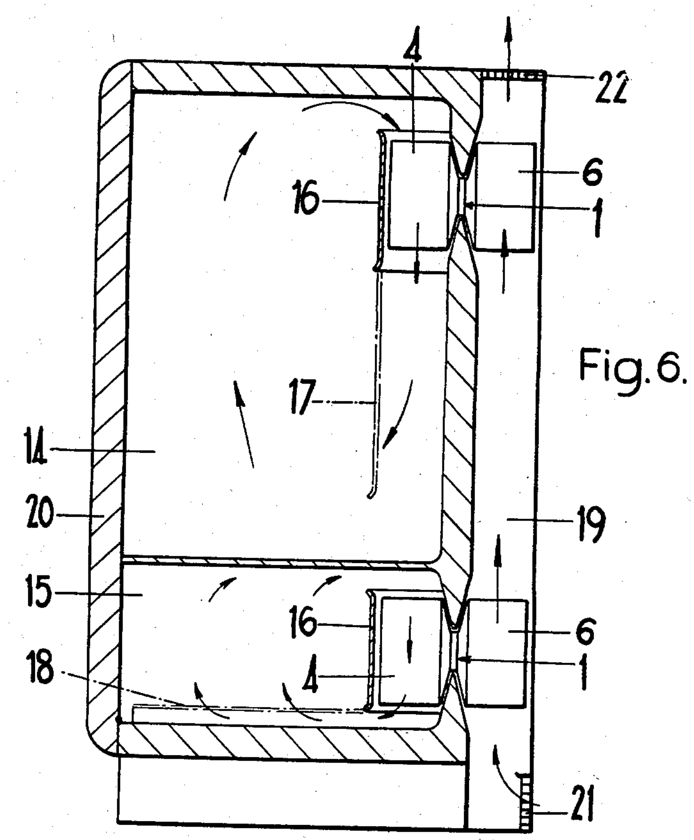
Figure 6 shows in section a side view of a refrigerator showing an alternative assembly of cooling units, in accordance with the present invention, for ice-making and food-storage compartments.
Figure 7:
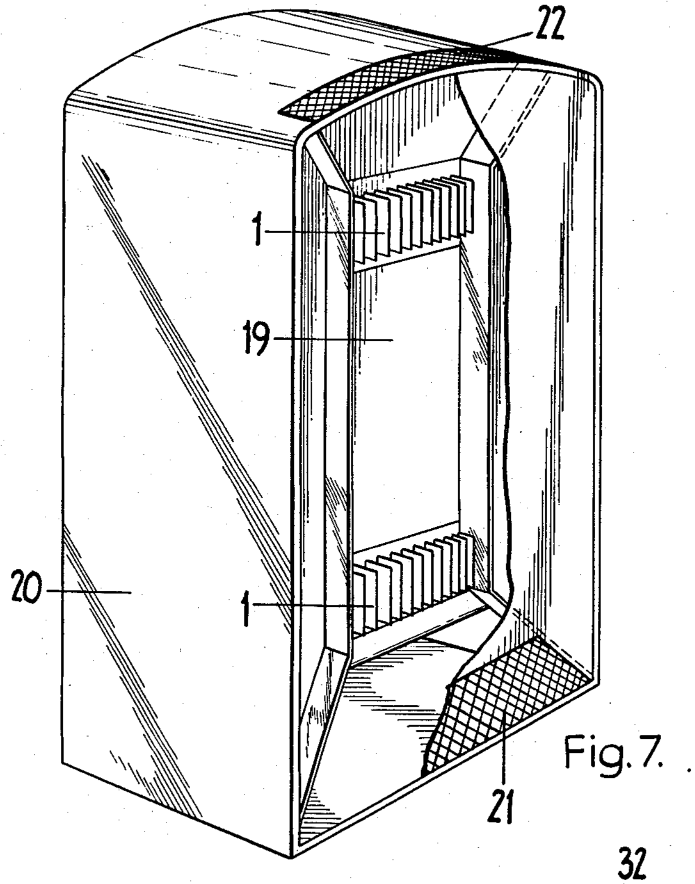
Figure 7 shows a rear perspective view, partly broken away, of a refrigerator having an assembly of cooling units similar to that shown in Figure 6.

Referring now to Figures 6 and 7 of the drawings, the figures show a double compartment refrigerator with a separately cooled ice-making compartment. There are two cooling units 1 of the kind described above, one being for a food storage compartment 14 and the other for an ice-making compartment 15. It is desirable that these cooling units should be operated independently of one another, so that one unit may be shut down while the other remains in operation. The latter cooling unit is preferably formed by two units arranged in cascade, that is to say the hot junctions of the first unit being cooled by the second unit. The internal fins of both units are shrouded by shrouds 16 to prevent metallic articles within the compartments from coming into contact with the live fins and these shrouds may also be useful as chimneys to accelerate the flow of air through the fins. An extended shroud could be employed for distributing cooled air to a particular part of a cooling compartment, or to improve the distribution of air generally. The extensions of the shrouds are designated in Figure 6 by 17 in the food storage compartment, and by 18 in the ice-making compartment. In the construction shown, natural air convection is utilised to maintain a flow of air through the fins 4, but forced air circulation could be employed.

The external fins 6 are shrouded by the walls of a duct system 19, the duct being narrow in the vicinity of the cooling fins to accelerate the flow of air therethrough. Near the bottom of the duct 19 and positioned in the rear wall of the cabinet 20 is an air intake 21, while an air outlet 22 is positioned at the top of the duct. In a modified construction, not shown, the air inlet is positioned in the front wall of the refrigerator cabinet, and a forced air circulation through the duct is maintained by means of a fan. The walls of the duct system, shrouding the external fins as before, may incorporate an arrangement of air vanes which would automatically close when the fan was not running, to reduce the heat losses that would otherwise occur by natural air convection through the duct.

In another arrangement, not shown in the drawings, which would be suitable for a refrigerator having an ice-making compartment and a food storage compartment and separate cooling units for the two compartments, the cooling fins attached to the hot junctions of the ice-making unit are situated in the food storage compartment, the said ice-making unit being mounted in the wall separating the two compartments.

Figure 8:
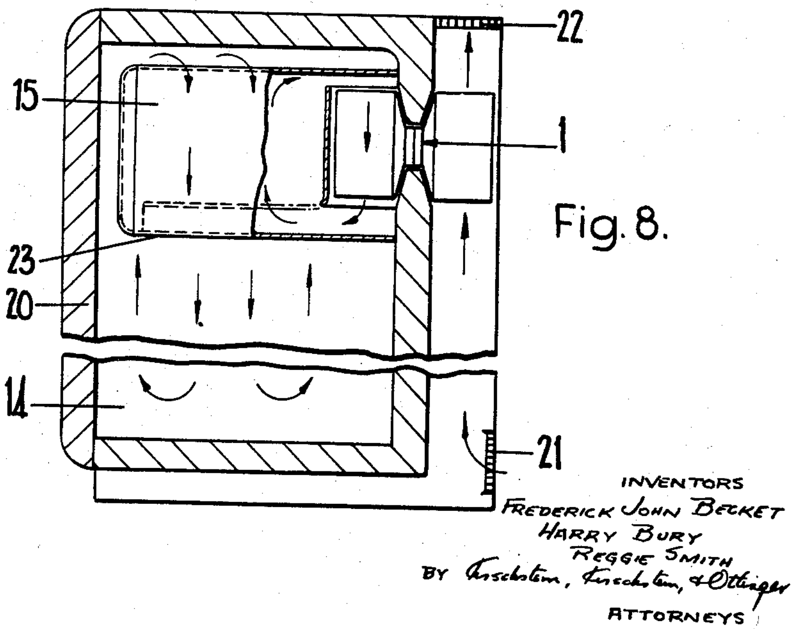
Figure 8 shows, in section, a side view of yet another refrigerator having a cooling unit in accordance with this invention.

Figure 8 shows another arrangement for a refrigerator incorporating a cooling unit of the kind described above. In this arrangement one cooling unit 1 only is used, this being arranged to cool an ice-making compartment 15 situated in the upper part of the refrigerator chamber of the refrigerator. The ice-making compartment is housed in a metal casing 23 which causes cooled air to circulate by convection throughout the food storage compartment 14.

An alternative method of transferring heat to or from the thermojunctions would be to use a liquid-vapour/phase cooling system whereby heat from the refrigerating chamber is transferred to the cold face of the semiconductor assembly via the condenser tank of the system. Two arrangements employing this method are shown in Figures 9 and 10.

Figures 9, 10:
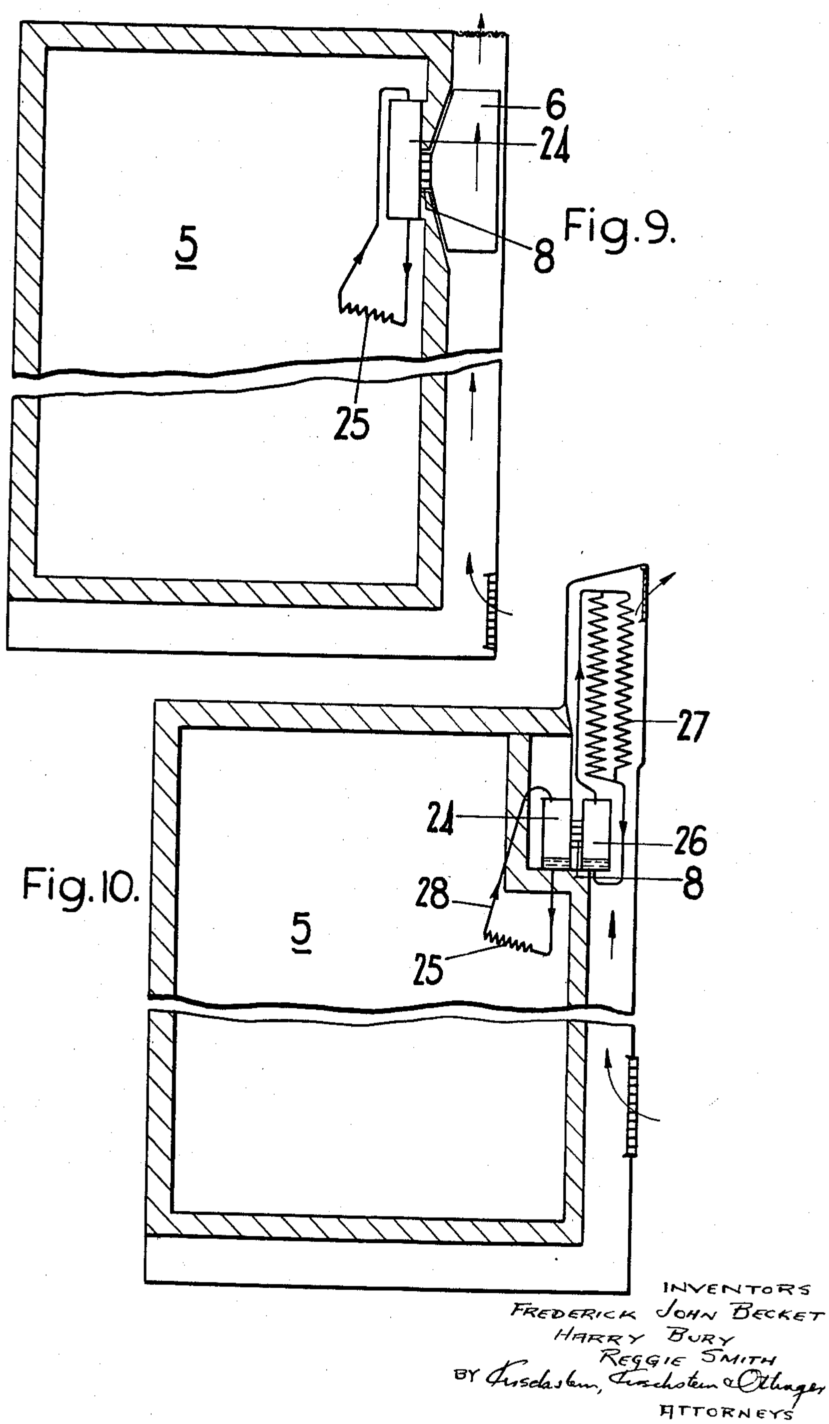
Figures 9 and 10 show in section side views of refrigerators each incorporating an alternative construction of cooling unit in accordance with the present invention.

Referring to Figure 9, the hot face of the semi-conductor assembly 9 is attached to air-cooled fins 6 in the manner previously described, the fins being cooled by natural or forced air circulation. The cold face of the said assembly is in thermal contact with the condenser tank 24 of a liquid-vapour/phase cooling system, the evaporator coil 25 of which is arranged to absorb heat from the refrigerating chamber 5. A further application of this method is shown in Figure 10, in which heat is transferred to or from the faces of the semiconductor assembly 8 by means of liquid-vapour/phase cooling. The small area external face of the semiconductor assembly is in thermal contact with the evaporator 26 of such a cooling system, while the condenser 27 of much greater surface area is situated in a stream of cooling air. Thus it will be seen that by a suitable arrangement of vapour carrying tubes, fins of small thickness could be used. A variation on this method would be to use forced liquid circulation, thus allowing freedom of choice in siting the cooling tubes and fins. The condenser tank 24 in contact with the cold face of the thermojunction assembly 8 is positioned outside the refrigerating chamber 5, while the evaporator coil 25 is inside the chamber. Thus, the chamber 5 is fully insulated thermally with only the pipe connections 28 passing through the chamber wall.

Figure 11:
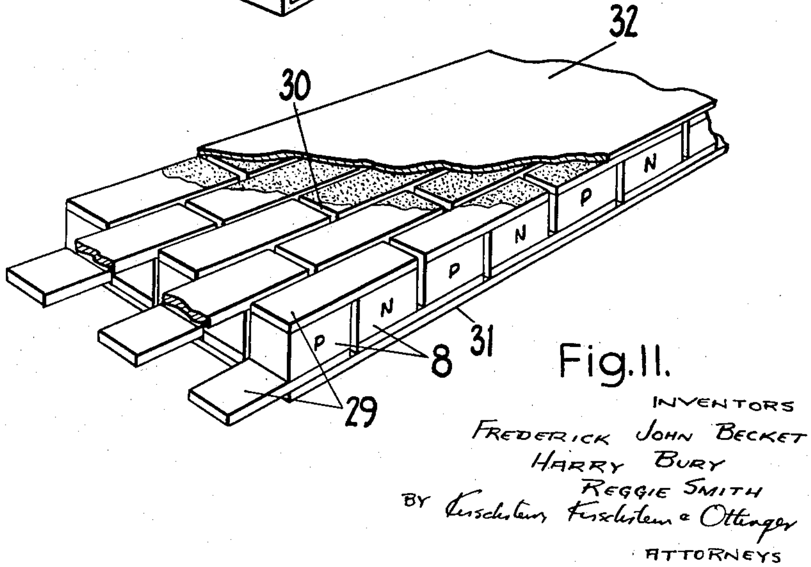
Figure 11 is a perspective view, partly broken away of an alternative construction of cooling unit, constructed in accordance with the present invention.

An alternative method of assembling the semiconductor elements to form a cooling unit will now be described, this unit being particularly suitable when the method of liquid-vapour/phase cooling is employed. Referring now to Figure 11, rows of semiconductor elements, each row consisting of alternate p and n type elements 8, are connected in a parallel/series formation by soldering copper connecting strips 29 to each semiconductor element. The spaces 30 between the elements 8 may be filled with thermally insulating plastic or resin. The assembly is then bonded to a hot face plate 31 and a cold face plate 32 of copper, or other suitable alternative material such as stainless steel, so as to be in good thermal contact therewith,, while at the same time these plates are insulated electrically from the conductors 29. This may be done by applying to the faces of the plates 31 and 32 and to the connecting strips 29 a varnish like coating and then assembling the whole with or without pressure to join the bonded surfaces, thus forming a sandwich-like structure. The face plates may become part of the condenser and evaporator tank of a liquid-vapour/phase cooling system, or alternatively could be attached to cooling fins to form an air-cooled arrangement.

The semiconductor elements 8 may be of bismuth telluride, but any other suitable semiconducting material may be used.

In operation, a refrigerator having a cooling unit of the kind hereinbefore described would be required to perform the following functions:

(1) To provide an ice-making compartment, (2) To reduce the temperature of the refrigeration chamber rapidly, when the temperature therein is too high, (3) To maintain a given temperature within the refrigerating chamber, (4) To provide for defrosting of the chamber, and (5) To operate under varying ambient conditions, for example summer and winter conditions, or home and overseas use.

In general, a high current, direct current supply is required to operate the semiconductor circuit at a voltage depending on the number and type of semiconductors in the circuit; the circuit would therefore include a transformer, a rectifier system, and possibly a smoothing choke. In addition, the cooling system may require either a fan or a pump operating from the HT or LT supply.

We claim:

1. A thermoelectric cooling unit comprising an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, first heat exchange means associated with said cold junctions, and second heat exchange means associated with said hot junctions, each of said heat exchange means comprising a first heat transfer surface disposed in heat exchange relationship with its associated junctions whereby to remove heat generated at said hot junctions and absorb heat at said cold junctions, a second heat transfer surface of substantially larger area than said first heat transfer surface whereby to dissipate heat to an external cooling medium and absorb heat from an internal cooling medium, and means for conveying heat between said first heat transfer surface and said second heat transfer surface.

2. A thermoelectric cooling unit according to claim 1, wherein said second heat exchange means comprises a metallic fin assembly disposed in heat exchange relationship with said hot junctions.

3. A thermoelectric cooling unit according to claim 1, wherein said second heat exchange means comprises a metallic fin assembly, the fins of said fin assembly being disposed in heat exchange relationship with said hot junctions and each connected thereto by way of a heavy sectioned fin root.

4. A thermoelectric cooling unit as claimed in claim 1, wherein said second heat exchange means comprises a liquid-vapor/phase cooling system including an evaporator component and a condenser component, said evaporator component being disposed in heat exchange relationship with said hot junctions.

5. A refrigerator comprising a refrigerating chamber, and assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, a liquid-vapor/phase cooling system including an evaporator component disposed within said chamber and a condenser component disposed in heat exchange relationship with said cold junctions, and heat exchange means comprising a first heat transfer surface disposed in heat exchange relationship with said hot junctions whereby to remove heat generated at said hot junctions, a second heat transfer surface of substantially larger area than said first heat transfer surface whereby to dissipate heat to an external cooling medium, and means for conveying heat from said first heat transfer surface to said second heat transfer surface.

6. A refrigerator comprising a refrigerating chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, heat exchange means associated with said cold junctions and said chamber, and a liquid-vapor/phase cooling system including an evaporator component and a condenser component, said evaporator component being disposed in heat exchange relationship with said hot junctions.

7. A refrigerator comprising a refrigerating chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, a metallic fin assembly associated with said cold junctions and disposed within said chamber and heat exchange means comprising a first heat transfer surface disposed in heat exchange relationship with said hot junctions whereby to remove heat generated at said hot junctions, a second heat transfer surface of substantially larger area than said first heat transfer surface whereby to dissipate heat to an external cooling medium, and means for conveying heat from said first heat transfer surface to said second heat transfer surface.

8. A refrigerator according to claim 7, wherein a shroud is provided, said shroud enclosing and isolating the fins of said fin assembly.

9. A refrigerator comprising a refrigerating chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, a metallic fin assembly associated with said cold junctions and disposed within said chamber, a shroud enclosing and isolating the fins of said fin assembly, said shroud being of extended form and providing an air duct whereby to convey air to a predetermined part of said chamber, and heat exchange means comprising a first heat transfer surface disposed in heat exchange relationship with said hot junctions whereby to remove heat generated at said hot junctions, a second heat transfer surface of substantially larger area than said first heat transfer surface whereby to dissipate heat to an external cooling medium, and means for conveying heat from said first heat transfer surface to said second heat transfer surface.

10. A refrigerator comprising a refrigerating chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, a metallic fin assembly disposed in heat exchange relationship with said cold junctions and disposed within said chamber, a metallic fin assembly disposed in heat exchange relationship with said hot junctions, and an air duct enclosing the fins of said fin assembly.

11. A refrigerator comprising a refrigerating chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, a liquid-vapor/phase cooling system including an evaporator component disposed within said chamber and a condenser component disposed outside said chamber and in heat exchange relationship with said cold junctions, and heat exchange means comprising a first heat transfer surface disposed in heat exchange relationship with said hot junctions whereby to remove heat generated at said hot junctions, a second heat transfer surface of substantially larger area than said first heat transfer surface whereby to dissipate heat to an external cooling medium, and means for conveying heat from said first heat transfer surface to said second heat transfer surface.

12. A refrigerator comprising a first refrigerating chamber, a second refrigerating chamber disposed in heat exchange relationship with said first chamber, an assembly of thermojunctions, each thermojunction having a p-type semiconductor element in association with an n-type semiconductor element and said elements being arranged in rows of alternate p-type and n-type elements which are electrically connected to provide hot junctions and cold junctions disposed on opposite sides of said assembly, heat exchange means associated with the cold junctions of said assembly and disposed within said second chamber, an air duct external to said chambers, and a metallic fin assembly disposed in heat exchange relationship with said hot junctions, the fins of said fin assembly being disposed in said air duct.

13. A refrigerator according to claim 12, wherein said second chamber is disposed within said first chamber.

References Cited in the file of this patent

UNITED STATES PATENTS

| | | |
|---|---|---|
| 413,136 | Dewey | Oct. 15, 1889 |
| 426,781 | Dewey | Apr. 29, 1890 |
| 1,120,781 | Altenkirch et al. | Dec. 15, 1914 |
| 1,818,437 | Stuart | Aug. 11, 1931 |
| 1,969,187 | Schutt | Aug. 7, 1934 |
| 2,481,469 | Brown | Sept. 6, 1949 |
| 2,584,573 | Gay | Feb. 5, 1952 |
| 2,589,551 | Iwashita | Mar. 18, 1952 |
| 2,749,716 | Lindenblad | June 12, 1956 |
| 2,777,975 | Aigrain | Jan. 15, 1957 |
| 2,837,899 | Lindenblad | June 10, 1958 |
| 2,844,638 | Lindenblad | July 22, 1958 |

FOREIGN PATENTS

| | | |
|---|---|---|
| 700,013 | France | Feb. 23, 1931 |

OTHER REFERENCES

"The Use of Semiconductors in Thermoelectric Refrigeration," "British Journal of Applied Physics," volume 5, November 1954, pages 386–390.